(12) United States Patent
Hodza et al.

(10) Patent No.: US 8,616,808 B2
(45) Date of Patent: Dec. 31, 2013

(54) MACHINE TOOL HAVING ADJUSTABLE PLATE ELEMENT

(75) Inventors: Erkan Hodza, Asperg (DE); Juergen Fronius, Walheim (DE); Benno Spors, Marbach (DE)

(73) Assignee: Komet Group GmbH, Besigheim (DE)

( * ) Notice: Subject to any disclaimer, the term of this patent is extended or adjusted under 35 U.S.C. 154(b) by 305 days.

(21) Appl. No.: 12/998,971

(22) PCT Filed: Feb. 23, 2010

(86) PCT No.: PCT/DE2010/050007
§ 371 (c)(1),
(2), (4) Date: Jun. 20, 2011

(87) PCT Pub. No.: WO2010/097082
PCT Pub. Date: Sep. 2, 2010

(65) Prior Publication Data
US 2011/0318118 A1    Dec. 29, 2011

(30) Foreign Application Priority Data
Feb. 24, 2009  (DE) .......................... 10 2009 010 119

(51) Int. Cl.
*B23C 5/24*   (2006.01)
(52) U.S. Cl.
CPC ........................................ *B23C 5/24* (2013.01)
USPC ............................................. 407/36; 407/39
(58) Field of Classification Search
USPC ................. 407/36, 37, 38, 39, 48, 87, 92, 98; 408/161, 162
IPC .......................... B23C 5/24; B23D 77/04,77/02
See application file for complete search history.

(56) References Cited

U.S. PATENT DOCUMENTS 3,217,384 A * 11/1965 Wirfelt ........................... 407/36
3,662,444 A    5/1972 Erkfritz
(Continued)

FOREIGN PATENT DOCUMENTS

DE    2110078    9/1971
DE    2163842    6/1973
(Continued)

OTHER PUBLICATIONS

English machine translation of DE 102007040936 A1.*

(Continued)

*Primary Examiner* — Andrea Wellington
*Assistant Examiner* — Alan Snyder
(74) *Attorney, Agent, or Firm* — Flynn, Thiel, Boutell & Tanis, P.C.

(57) ABSTRACT

The main body (12) of a machine tool (10) comprises a plate seat (18) having a plate element (16) arranged thereon. The plate element (16) has at least one plate edge (38), which protrudes freely to the outside over the plate seat (18) and rests against a bottom support surface of the plate seat (18). The plate element (16) can be fixed to the plate seat (18) by way of a bolt (20) extending through a bore hole in the plate element (16). A first brace (22) for the plate element (16) is provided on the plate seat (18), said brace having a support surface (34) against which the plate element (16) rests non-positively with a lateral plate surface. A further brace (24) is designed on the plate seat (18) for a lateral plate surface of the plate element (16) to rest against non-positively. In order to adjust the plate edge (38) of the plate element (16), an adjustment device (30) is associated with at least one brace (22) and enables the brace (22) to be raised and lowered with respect to the bottom support surface of the plate seat (18). A linear guide (50) is provided for said at least one brace (22), said guide absorbing the forces and torque occurring during the adjustment of the plate element (16) and introducing them into the main body (12) of the machine tool (10).

21 Claims, 9 Drawing Sheets

(56) References Cited

U.S. PATENT DOCUMENTS

| | | | |
|---|---|---|---|
| 4,533,282 A * | 8/1985 | Lindlar et al. ................. 407/38 |
| 5,716,169 A | 2/1998 | Schuerfeld |
| 6,692,198 B2 | 2/2004 | Kress |
| 7,101,121 B2 | 9/2006 | Wermeister et al. |
| 7,275,894 B2 | 10/2007 | Schlagenhauf et al. |
| 7,322,777 B2 * | 1/2008 | Jager et al. .................... 408/153 |
| 2002/0081168 A1 | 6/2002 | Kress |
| 2003/0215294 A1 | 11/2003 | Wermeister et al. |
| 2006/0056925 A1 | 3/2006 | Hecht et al. |
| 2006/0140730 A1 | 6/2006 | Schlagenhauf et al. |
| 2007/0280790 A1 * | 12/2007 | Kovac ........................... 407/30 |
| 2007/0280799 A1 | 12/2007 | Takiguchi et al. |
| 2009/0148245 A1 | 6/2009 | Choi et al. |
| 2009/0263198 A1 | 10/2009 | Matheis |

FOREIGN PATENT DOCUMENTS

| | | |
|---|---|---|
| DE | 8025087 | 2/1981 |
| DE | 3616230 A1 | 11/1987 |
| DE | 89 13 294.7 | 2/1990 |
| DE | 44 02 503 A1 | 8/1995 |
| DE | 19601666 A1 | 7/1997 |
| DE | 20103921 U1 | 5/2001 |
| DE | 102 50 018 A1 | 5/2004 |
| DE | 102007040936 A1 * | 3/2009 |
| EP | 1356885 A2 | 10/2003 |
| EP | 1454694 A1 | 9/2004 |
| EP | 1864738 A1 | 12/2007 |
| GB | 2094191 A | 9/1982 |
| JP | 10-277839 | 10/1998 |
| WO | WO 9516543 A1 | 6/1995 |
| WO | WO 2006/030416 A1 | 3/2006 |
| WO | WO 2007/058513 A1 | 5/2007 |
| WO | WO 2008/058524 A1 | 5/2008 |

OTHER PUBLICATIONS

German Patent Office Search Report dated Sep. 24, 2009 (4 pages) with English translation of p. 2.
International Search Report dated Aug. 10, 2010 (7 pages) with English translation of categories of documents cited.

* cited by examiner

MACHINE TOOL HAVING ADJUSTABLE PLATE ELEMENT

The invention relates to a machine-operated tool comprising a parent body, comprising at least one insert element which is arranged in an insert seat on the parent body and which has at least one insert edge projecting freely outward beyond the insert seat and bearing against a bottom supporting surface of the insert seat and which can be secured to the insert seat by means of a screw which passes through a hole in the insert element, in which machine-operated tool a first abutment is provided for the insert element at the insert seat, said abutment having a bearing surface against which the insert element bears frictionally with a lateral insert surface, and in which a further abutment having a bearing surface for a lateral insert surface of the insert element to bear against frictionally is formed at the insert seat, wherein an adjusting device is assigned to at least one abutment for setting the insert edge of the insert element, said adjusting device enabling the abutment to be lifted and lowered with respect to the bottom supporting surface of the insert seat.

A machine-operated tool of the type mentioned at the beginning is known from DE 196 01 666 A1. Described in this document is a machine-operated tool for reaming, having cutting inserts and a cutting-insert adjusting mechanism. The cutting inserts are secured in an insert seat to the parent body of the machine-operated tool by a clamping screw. There is an adjusting mechanism for a cutting insert. This cutting insert has a section having a first and a second recess, said section being opposite the active cutting edge. An adjusting screw is located at the first recess. A stop pin is located at the second recess. The adjusting screw and the stop pin form abutments for the cutting insert. The adjusting screw can be lifted and lowered relative to the insert seat by turning said adjusting screw. As a result, the cutting edge of the cutting insert on the insert seat can be set.

When the cutting insert is being adjusted, a bending force acts on the adjusting screw. This bending force is introduced into the parent body of the machine-operated tool via the thread of the adjusting screw. The loading of the adjusting screw by bending forces requires high adjusting forces during the setting of the cutting insert and is detrimental to the setting accuracy.

The object of the invention is to provide a machine-operated tool having an adjustable insert element, in which machine-operated tool the position of an insert element, in particular a cutting insert and/or a guide insert, can be set on an insert seat exactly and with comparatively small expenditure of force.

This object is achieved by a machine-operated tool having the features of claim 1.

The solution according to the invention is based on the knowledge that, in a machine-operated tool, a very fine adjustment can be made to an insert element, in particular a cutting insert or a guide insert, by means of at least one adjustable abutment if the forces and moments, in particular bending and torsional moments, transmitted to the abutment during the setting of the insert element are introduced into the parent body of the machine-operated tool not by an adjusting screw but rather via a linear guide for the abutment.

This enables the machine-operated tool to be set, during which setting the insert element is prepositioned in the insert seat by adjusting an abutment to an undersize in a first step, the insert element is secured in the insert seat to the parent body in a defined manner by means of the screw which passes through a hole in the insert element, preferably with the use of a torque wrench, in a subsequent second step, and then the abutment is readjusted to a desired specified size while simultaneously measuring the setting of the insert element in a third step.

The parent body of the machine-operated tool preferably has a tool axis, which is a rotation axis, about which the parent body of the machine-operated tool can be driven. However, the tool axis of the machine-operated tool can also be a rotation axis for a workpiece which, for machining with the machine-operated tool, is rotationally moved about the tool axis relative to the parent body of said machine-operated tool.

In the machine-operated tool according to the invention, the insert element secured to the insert seat can be set without having to release the fastening screw for the insert element, said fastening screw passing through the hole in the latter.

In contrast, the setting of insert elements in the form of cutting inserts in conventional machine-operated tools requires the clamping or fastening screw for the cutting insert or a corresponding clamping shoe to be released during the "adjustment" of the cutting insert position. Here, the problem occurs that a cutting insert is out of adjustment again when it is subsequently required to be secured again with the clamping or fastening screw or clamping shoe. Compared with conventional machine-operated tools, the machine-operated tool according to the invention can therefore be set in a shorter time and with fewer operations.

By virtue of the fact that the bearing surface of the at least one abutment or the lateral insert surface, bearing against the abutment, of the insert element is curved, preferably convexly curved, or prismatically curved with segmental surface sections which are arranged in a row, the abutment can roll on the lateral insert surface of the insert element on account of slight play in the linear guide. During the adjustment of the insert element, no settling effects then occur and the abutment cannot jam in the linear guide. In particular, it is advantageous to design the adjustable abutment as an adjusting wedge having a curved wedge surface. The wedge surface is in this case preferably convexly curved in a first direction and additionally in a second direction different from the first direction. Point or linear contact of an abutment and of the lateral insert surface, bearing against it, of the insert element is thus effected. The invention is based on the further knowledge that excessive return moments which an insert element introduces into a corresponding abutment during the machining of materials can thereby be avoided. An insert element, in particular a cutting insert, during the machining of materials with the machine-operated tool, is thus prevented from being adjusted in an undefined manner in particular on account of the "chatter effect".

In the machine-operated tool, not only is one abutment advantageously designed to be adjustable, but rather there are two or more adjustable abutments which can be lifted and lowered with respect to the bottom supporting surface of the insert seat and which act on a lateral insert surface of the insert element. In this way, it is possible to position, in particular rotate and displace, an insert element on the machine-operated tool in a defined manner with a plurality of degrees of freedom.

If, in a machine-operated tool, a cutting insert having a cutting corner which produces the diameter is used as insert element, it is favorable to arrange the adjustable insert at the insert seat in such a way that the adjusting force introduced into the insert element by the abutment points toward the cutting corner. This enables the diameter of the machine-operated tool to be defined solely via the setting of this abutment.

An insert element, in particular a cutting insert on an insert seat of the machine-operated tool, can bear with a common lateral insert surface or with different lateral insert surfaces against the abutments for the cutting inserts.

It is favorable to arrange all the adjustable abutments in a linear guide which absorbs moments of force and torsional moments occurring during the setting of the insert element and directs them into the parent body of the machine-operated tool.

A differential screw guided on the abutment and in the parent body of the machine-operated tool is especially suitable as adjusting device for an abutment. The differential screw holds the abutment. The arrangement ensures that the differential screw is stressed in tension and compression only in the direction of the axis thereof during the adjustment of the insert element. Undesirable bending moments do not occur at the differential screw in this arrangement. The differential screw can thus be set very precisely without peak forces occurring.

The abutment preferably has a curved bearing surface having a vertex. The linear guide has a guide section curved in a circular arc shape for the linear guide, wherein the axis of the differential screw lies at the center of this guide section curved in a circular arc shape. In this case, the radius of curvature of the bearing surface at the vertex is matched to the linear guide: it is not substantially greater than 12 times the distance of the vertex from the axis of the differential screw. The radius of curvature of the bearing surface at the vertex preferably corresponds to 8 to 10 times the distance of the vertex from the axis of the differential screw, i.e. 8 to 10 times the radius of curvature for the guide section, curved in a circular arc shape, of the linear guide. It has been found that this measure enables very high adjusting forces to be absorbed with the abutment without the abutment jamming in the linear guide.

The differential screw can be arranged on the parent body of the machine-operated tool in an inclined manner relative to the bottom supporting surface for the cutting insert on the insert seat. This enables the magnitude of an adjusting force transmitted to the insert element by the corresponding adjustable abutment to be adjusted very accurately.

The machine-operated tool according to the invention is especially suitable for use as a tool for producing precision-machined bores in a workpiece in a single machining step, which covers the conventional boring operations of counter-boring and fine boring. This is because this requires a special cutting edge geometry, which can be formed especially effectively on cutting inserts.

The machine-operated tool according to the invention can be used, for example, as a reaming tool, as a boring tool, in particular as a tool for counterboring and/or as a tool for fine boring, but also as a milling tool.

The invention is explained in more detail with reference to the exemplary embodiments shown schematically in the drawing, in which.

Figure 1:
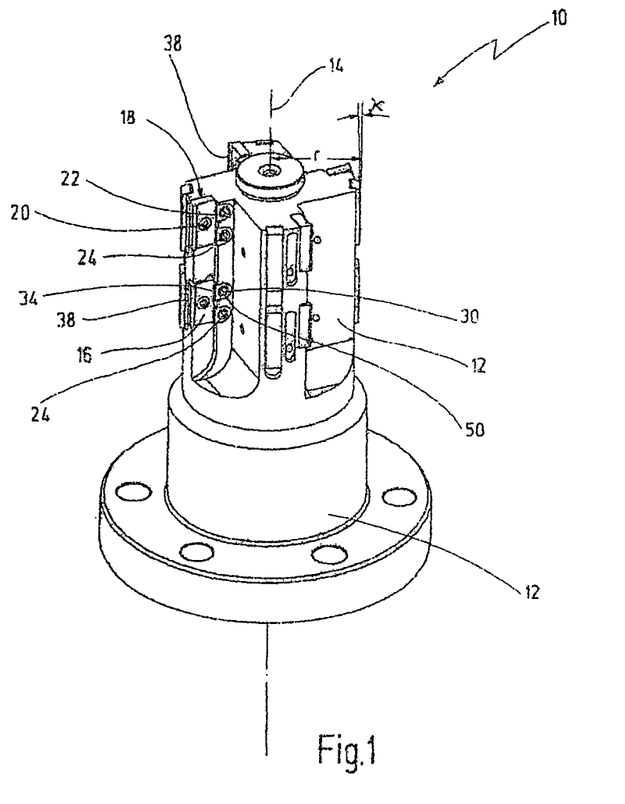
FIG. 1 shows a first machine-operated tool having adjustable cutting inserts.

The first machine-operated tool 10 shown in FIG. 1 is a reaming tool. It has a parent body 12. The parent body 12 has a tool axis 14. The tool axis 14 is a rotation axis. The machine-operated tool 10 can be moved about the rotation axis 14 by connection to a machine spindle of a machine tool (not shown in any more detail). Eight insert elements in the form of indexable cutting inserts 16 are arranged on the parent body 12 of the machine-operated tool 10. Each indexable cutting insert lies in an insert seat 18. Each indexable cutting insert 16 is secured in its insert seat 18 to the parent body 12 of the machine-operated tool 10 by a screw 20. The screw 20 acts as a clamping or fastening screw for the cutting inserts 16.

At each insert seat 18 of the cutting inserts 16 there is a first adjustable abutment 22 and second adjustable abutment 24. The screw 20 is elastically deformed by setting the abutments 22, 24. As a result, a radius r and a taper angle κ with respect to the rotation axis 14 can be adjusted for an indexable cutting insert 16 arranged on the insert seat 18.

Figure 2:
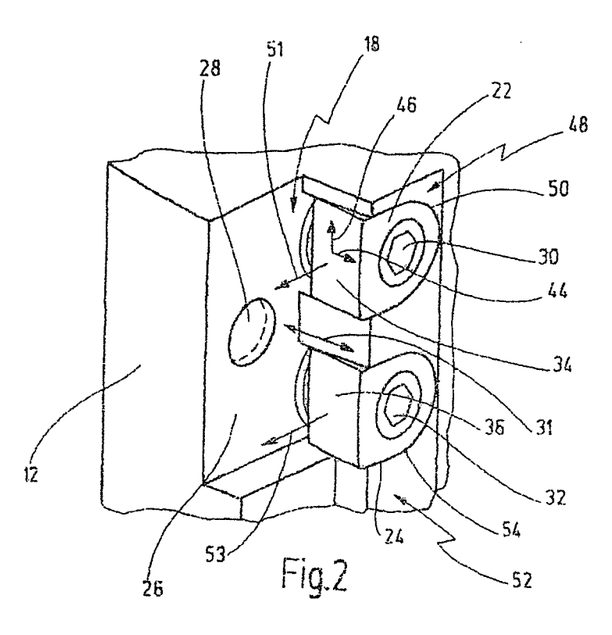
FIG. 2 shows an insert seat on the first machine-operated tool without cutting insert.

FIG. 2 shows an insert seat 18, formed on the parent body 12 of the machine-operated tool, without the cutting insert. The insert seat 18 has a bottom supporting surface 26. A tapped hole 28 for the screw 20 is located in the bottom supporting surface 26.

The abutments 22 and 24 are configured as adjusting wedges, each with a wedge surface 34, 36, which is convexly curved in two opposite directions 44, 46. The wedge surfaces 34, 36 are inclined toward the bottom supporting surface 26 of the insert seat 18. They act as curved bearing surfaces 34, 36 for the lateral insert surface 40 of a cutting insert 16, said lateral insert surface 40 being opposite that insert edge of the cutting insert 16 which is designed as cutting edge 38.

In the parent body 12 of the machine-operated tool, a linear guide 50 is formed in a section 48 and a linear guide 54 is formed in a section 52 for the abutments 22 and 24. The linear guides 50, 54 absorb moments of force and torsional moments which occur at the abutments 22, 24 on account of adjusting forces for the cutting insert. They direct said moments into the parent body 12 of the machine-operated tool 10.

A differential screw 30 and a differential screw 32 are provided as a adjusting device for the abutments 22, 24. A first thread 33 on the parent body 12 of the machine-operated tool 10 and a second thread 56 in an abutment are assigned to each differential screw 30, 32.

Figure 3:
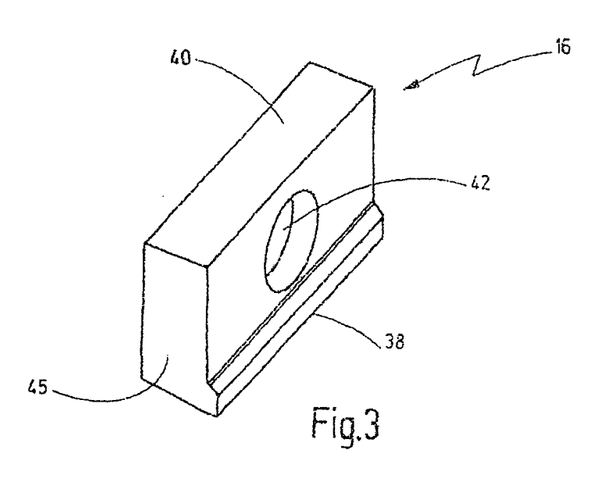
FIG. 3 shows a cutting insert of the first machine-operated tool.

FIG. 3 shows a cutting insert 16. A through-hole 42 having a countersink for the screw 20 is formed in the cutting insert 16.

Figure 4A:
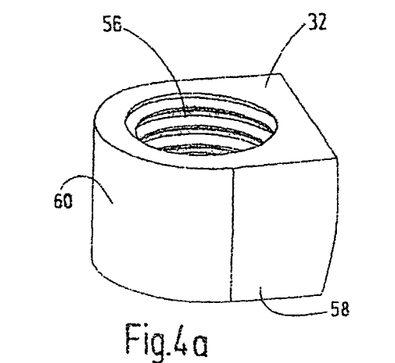
FIGS. 4a and b show views of an adjustable abutment for a cutting insert on the first machine-operated tool.
Figure 4B:
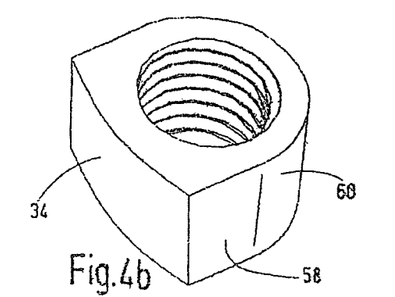

Different perspective illustrations of the abutment 22 are depicted in FIG. 4a and FIG. 4b. The abutment 22 has a tapped hole 56 for the differential screw 30. With the flat tangential surface section 58 and the curved outer surface section 60, it lies in a positive-locking manner, with slight play, in the guide 50 on the parent body of the machine-operated tool. The same correspondingly applies to the abutment 24.

Figure 5:
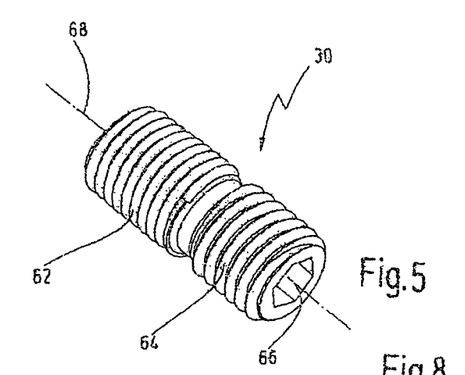
FIG. 5 shows a differential screw as an adjusting device for the adjustable abutment.

FIG. 5 shows a differential screw 30 for the abutment 22. The differential screw 30 has a first thread and a second thread 64. The threads 62 and 64 are designed to run in opposite directions. For the thread 62, there is a mating thread 31 in the parent body 32 of the machine-operated tool 10. The mating thread for the thread 64 is the tapped hole 56 in the abutment 22. The differential screw 30 has a wrench engagement means 66 for attaching an adjusting wrench. The same correspondingly applies to the differential screw 32 of abutment 24. The wrench engagement means 66 is preferably a hexagon socket.

By means of the differential screws 30, 32, the abutments 22, 24 can be lifted and lowered relative to the bottom supporting surface 26 on the insert seat 18 of the cutting insert according to the double arrow 31 shown in FIG. 2.

Different, defined, very high adjusting forces running according to the arrows 51, 53 can be introduced into the cutting insert 16 by lifting and lowering the abutments 22, 24. This enables the position of the cutting edge 38 of the cutting insert 16 to be set exactly and in particular enables radius r and a taper angle κ of the cutting insert 16 to be adjusted with respect to the tool axis 14 of the machine-operated tool 10.

In this case, the guides 50 and 54 on the parent body 12 for the abutments 22, 24 ensure that the adjusting forces for the cutting insert 16 are introduced into the parent body 12 without shearing forces and bending moments being transmitted to the differential screws 30 and 32 in the process. Via the flat outer surface sections 58 of the abutment 22, torques and tilting moments occurring on said abutment 22 are introduced into the parent body 12 of the machine-operated tool 10. The curved outer surface section 60 of an abutment 22 correspondingly draws off moments of force and tilting moments to the parent body 12 of the machine-operated tool. The same correspondingly applies to the abutment 32. Therefore, when setting radius r and taper angle κ of a cutting insert 16 on the machine-operated tool 10, the differential screw 30, 32 is merely loaded with tension or compression forces which act in the direction of the axis 68 of the differential screw 30, 32.

Because the bearing surfaces 34 and 36 of the abutments 22, 24 are curved, the abutments 22, 24 act virtually in a point-like manner on the insert edge 40 of a cutting insert arranged on the insert seat 18.

Figure 6:
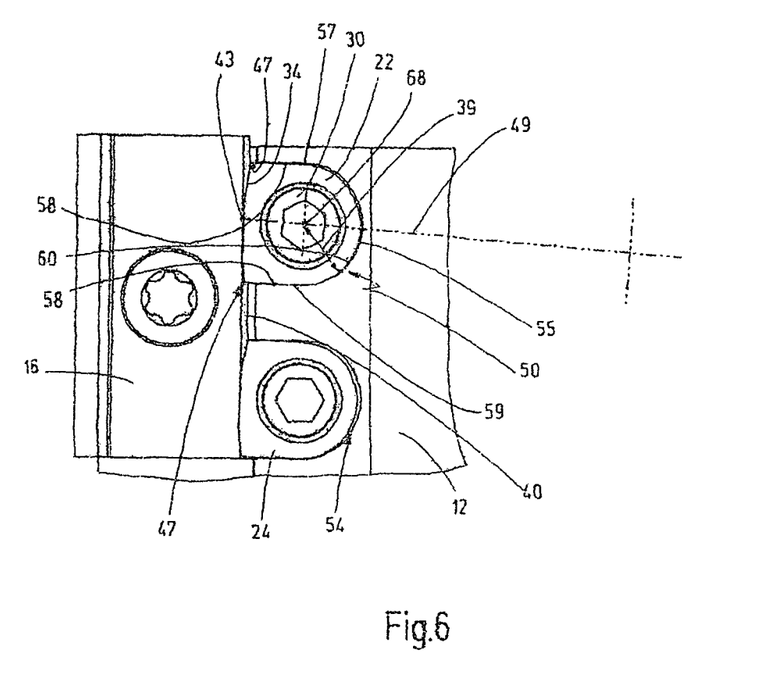
FIG. 6 shows a section of the first machine-operated tool having an adjustable cutting insert.

FIG. 6 shows a section of the machine-operated tool 10 having a cutting insert 16. The bearing surface of the abutment 22 is designed to correspond to a circle of curvature, the radius 49 of which at the vertex 43 intersects the axis 68 of the differential screw 30. The linear guide 50 has a guide section 55 curved in a circular arc shape and a guide section 57 and also a guide section 59. The guide sections 57 and 59 are configured as plane surfaces. The outer surface section 60 of the abutment 22 bears with slight play against the guide section 55 curved in a circular arc shape. Accordingly, the flat tangential surface section 58 of abutment 22 bears against the guide sections 57 and 59 designed as plane surfaces. The vertex 43 of the bearing surface 34 and the axis 68 of the differential screw 68 are at a distance apart which to the radius 399 is 8 times the radius 39. However, the ratio of radius 49 to radius 39 could also be, for example, 10:1; although it should not substantially exceed 12:1. It is important that the play of the abutment 22 in the linear guide 50 is so slight that the abutment 22 and the lateral insert surface 40 of the cutting insert 16 cannot bear against one another in the corner region 47. This ensures that the abutment 22 cannot jam in the linear guide 50 and that the forces introduced into the abutment 22 by the cutting insert 16 are substantially absorbed via the guide section 55, curved in a circular arc shape, of the linear guide 50. The same correspondingly applies to the abutment 24 in the linear guide 54. In particular, disturbing settling effects during the adjustment of the cutting insert 16 can be avoided by this measure.

It should be noted that, instead of designing the bearing surfaces 34, 36 of the abutments 22, 24 in a curved manner, the insert edge 40 of the cutting insert 16 can be configured with a convex curvature. It is also possible to design both the bearing surfaces 34, 36 of the abutments 22, 24 and the insert edge 40 with a curvature. A convex curvature of the corresponding components in two different directions ensures that the adjusting force to be introduced for an adjustment of the cutting inserts by setting the differential screws changes relatively uniformly.

The machine-operated tool shown in FIG. 1 can also be used as a milling tool if it is provided with cutting inserts for milling instead of the indexable cutting inserts 16.

Figures 7, 8:
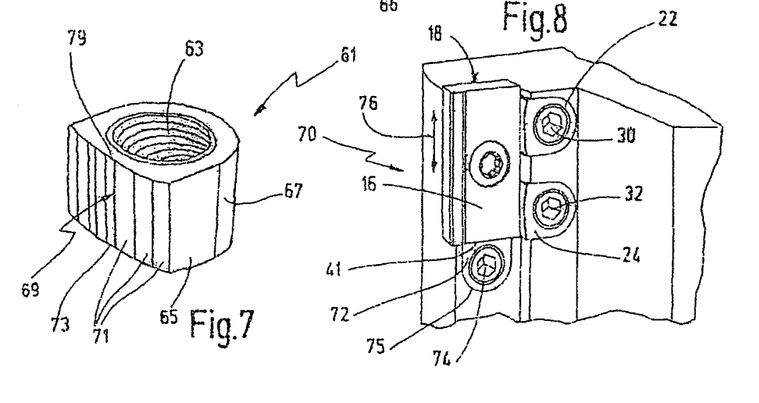
FIG. 7 shows an alternative embodiment of an adjustable abutment.
FIG. 8 shows a section of a second machine-operated tool having an adjustable cutting insert.

FIG. 7 shows an alternative embodiment 61 for an abutment in the machine-operated tool shown in FIG. 1. Here, too, a tapped hole 63 for a differential screw 30 is provided. The alternative embodiment 61 for an abutment has, like the abutment 22 in FIG. 4, a flat tangential surface section 65 and a curved outer surface section 67. The surface sections 65 and 67 permit positive-locking bearing in the guide 50 against the parent body 12 of the machine-operated tool.

In the abutment 61, a prismatically curved bearing surface 69 is formed. The prismatically curved bearing surface 69 consists of a multiplicity of surface sections 71 which are arranged segmentally in a row. The surface sections can be produced, for example, by grinding. The surface sections 71 are of flat design in the abutment 61. They run from a bottom edge 73 of the bearing surface 69 to a top edge 79. At an insert seat 18 of the machine-operated tool 10 shown in FIG. 1, the surface sections 71 arranged segmentally in a row are each inclined toward the bottom supporting surface 26 of the insert seat 18. The prismatically curved bearing surface 69 is therefore a wedge surface.

In the section of a second machine-operated tool 70 shown in FIG. 8, there is a third adjustable abutment 72 at the insert seat 18 of an insert element in the form of a cutting insert 16 in addition to a first adjustable abutment 22 and a second adjustable abutment 24 which have the design of the abutments in the machine-operated tool 10 from FIG. 1. The abutment 72 is located in a linear guide 75 and is designed like the abutments 22 and 24. It acts on the lateral insert surface 41 of the cutting insert 16. Here, by adjusting the differential screws 30, 32 and 74 assigned to the abutments 22, 24, 72, not only can the radius and the taper of the cutting insert 16 be set with respect to the rotation axis of the machine-operated tool 70, but the position of the cutting insert 16 can also be set according to the directions of the double arrow 76.

Figure 9:
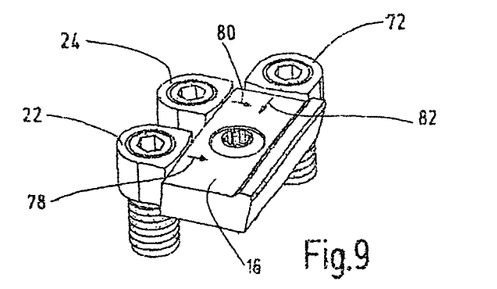
FIG. 9 shows a cutting insert of the second machine-operated tool having a first, a second and a third abutment.

FIG. 9 shows a cutting insert 16 having the abutments 22, 24 and 72. Adjusting forces 78, 80 and 82 are introduced into the cutting insert 16 by means of the abutments 22, 24 and 72. These adjusting forces 78, 80 and 82 can be set precisely by turning the differential screws 30, 32 and 74 in order thus to cause elemental movements of the cutting insert secured to the insert seat 18 by means of the screw 20.

Figure 10:
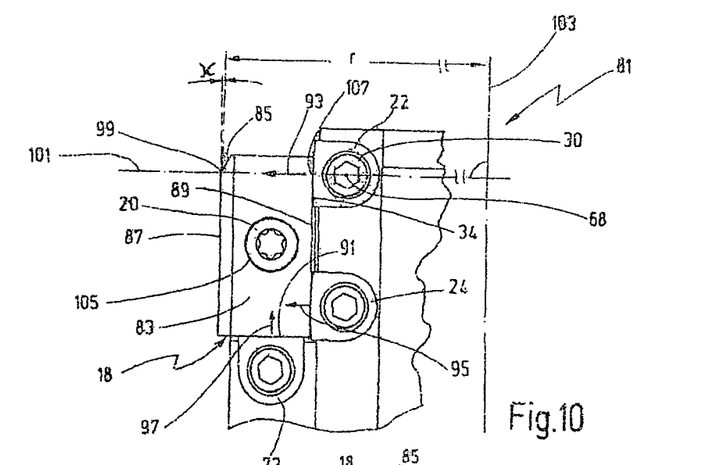
FIG. 10 shows a section of a third machine-operated tool having adjustable cutting inserts.

FIG. 10 shows a section of a third machine-operated tool 81. The machine-operated tool 81 has an insert seat with an insert element designed as a cutting insert 83. The cutting insert 83 has a main cutting edge 85 and a secondary cutting edge 87. The cutting insert 83 is again secured to the insert seat 18 by means of a screw 20 which passes through a hole 105 in the cutting insert 83. As in the machine-operated tool 70 from FIG. 8, a first, a second and a third adjustable abutment 22, and 72 are provided on the insert seat 18 of the machine-operated tool 81. They act on lateral insert surfaces 89 and 91 of the cutting insert 83. The abutments 22, 24 and 72 serve to introduce adjusting forces 93, 95 and 97 into the cutting insert 83. On account of these adjusting forces, the cutting insert 83 is moved on the insert seat 18, in the course of which the screw 20 acts as a solid joint.

By adjusting the adjustable abutment 72 at the insert seat 18 of the machine-operated tool 81, the cutting insert 83 can thus be set in such a way that the abutment 22 acts on the cutting insert 83 with an adjusting force 93 which points towards the cutting corner 99, which lies between the main cutting edge 85 and the secondary cutting edge 87. In the machine-operated tool 81, a straight line 101, which runs exactly at a right angle to the rotation axis 103 of the machine-operated tool 81, is then defined via the vertex 107 of the bearing surface 34, designed as a wedge surface, of abutment 22 or the axis 68 of the differential screw 30 for the first abutment 22 and the cutting corner 99 between the main cutting edge 85 and the secondary cutting edge 87.

In the machine-operated tool 81, the arrangement of the abutments 22, 24 and 72 permits especially quick setting of pitch circle radius and taper:

This is because, if the abutment 72 at the insert seat 18 has been adjusted in a first step in such a way that the straight line 101 defined with the vertex 107 of the bearing surface 34 of abutment 22 and the cutting corner 99 of the cutting insert 83 runs perpendicularly to the rotation axis 103 of the machine-operated tool 81, the radial position of the cutting edge corner 99 and thus the radius r of the pitch circle, i.e. the effective diameter in the machine-operated tool 81, can be set in a subsequent step by setting the abutment 22. By subsequent adjustment of the adjustable abutment 24, the taper angle κ of the cutting edge 86 with respect to the rotation axis 103 of the machine-operated tool 81 can then be established.

The specified sequence for the setting of the abutments 72, 22 and 24 enables the radius r of the pitch circle to be adjusted solely via the abutment 22 and correspondingly enables the taper angle κ in the machine-operated tool 81 to be adjusted by setting the abutment 24 without changing the radius r of the pitch circle in the process.

Figure 11:
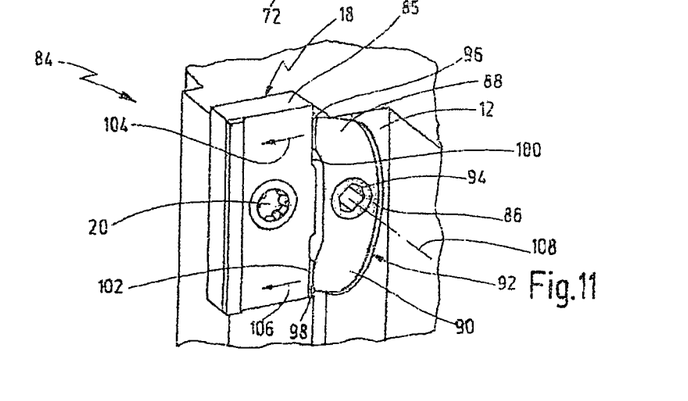
FIG. 11 shows a section of a fourth machine-operated tool having adjustable cutting inserts.

In the section of a fourth machine-operated tool shown in FIG. 11, having a cutting insert 85 accommodated on an insert seat 18, there is an adjusting unit 86 having a first abutment 88 and a second abutment 90. The adjusting unit 86 is accommodated in a linear guide 92 formed on the parent body 12. The adjusting unit can be moved in the linear guide 92 by means of a differential screw 94. The first abutment 88 and the second abutment 90 act with convexly curved bearing surfaces 96, 98 on flat insert edge surfaces 100, 102. Adjusting forces 104, 106 can be introduced into the cutting insert 85 via the abutments 88 and 90. This in turn results in an adjustment of the cutting insert 85. In this case, the linear guide for the adjusting unit having the abutments 88 and 90 ensures that the force opposing the adjusting forces 104, 106 is introduced into the parent body 12 of the machine-operated tool. The result of this is that the differential screw 94 is only stressed in tension and compression in the direction of its axis 108 during the adjustment and is not subjected to any bending moments.

This in turn enables the cutting insert 85 to be adjusted precisely on the insert seat 18 by turning the differential screw 94 when fastening screw 20 is secured.

Figure 12:
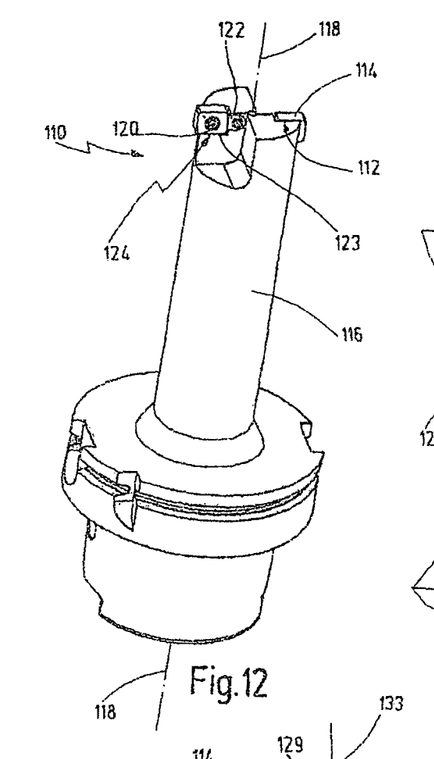
FIG. 12 shows a fifth machine-operated tool having two adjustable cutting inserts.

With the fifth machine-operated tool 110 shown in FIG. 12, precision-machined bores can be produced in a workpiece in a single machining step: this machine-operated tool enables counterboring and fine boring in one operation. In the machine-operated tool 110, two cutting inserts 114 arranged in an insert seat 112 are provided in a parent body 116. The machine-operated tool has a rotation axis 118. Each cutting insert 114 is secured in its insert seat 112 against the bottom supporting surface thereof by a fastening screw 120 which passes through the cutting insert. In a machine-operated tool 110, the bottom supporting surface on an insert seat and the rotation axis 118 are parallel to one another.

Figure 13:
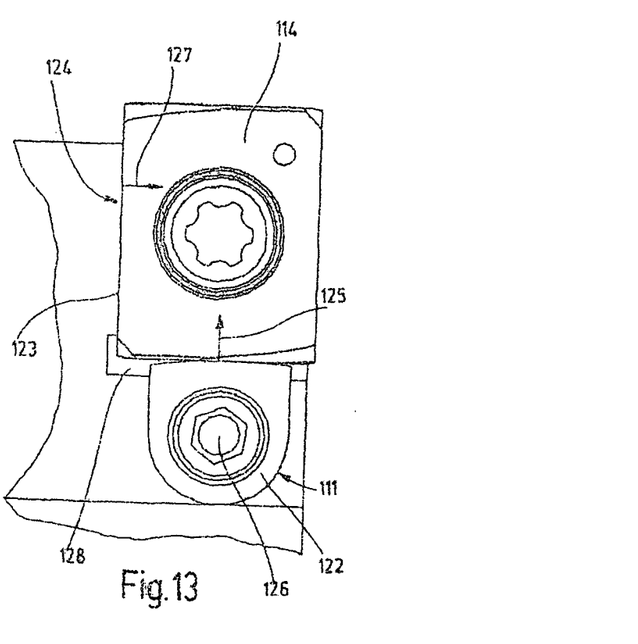
FIG. 13 shows a section of the fifth machine-operated tool.

FIG. 13 shows the sections of the machine-operated tool 110 from FIG. 12 in a side view, with cutting inserts 114 arranged in the insert seat 112. A first adjustable abutment 122 and a fixed abutment 124 formed by a side edge 123 of the insert seat are located at the insert seat 112.

The adjustable abutment 122 is designed identically to the abutment 22 in the machine-operated tool 10 from FIG. 1. For the adjustable abutment 122, there is a linear guide 111 in the parent body 116 of the machine-operated tool 110. The abutment 122 can be lifted and lowered in the linear guide 111 relative to the bottom supporting surface 128 of the insert seat 112 by means of a differential screw 126. Adjusting forces 125 and 127 are introduced into the cutting insert 114 via the abutments 122, 124.

Figure 14:
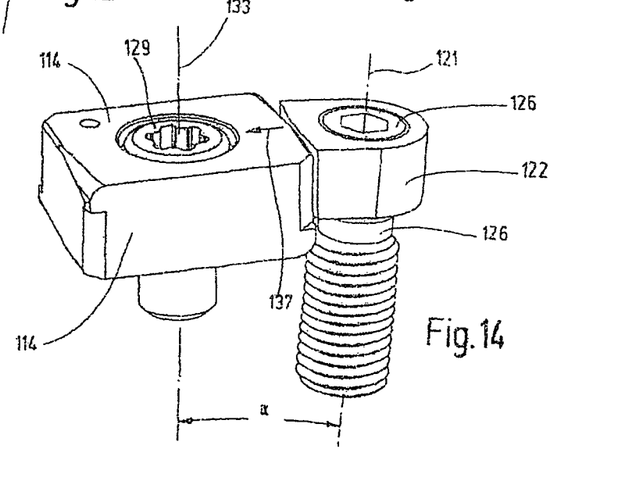
FIG. 14 shows a cutting insert of the fifth machine-operated tool having an adjustable abutment.

FIG. 14 shows the cutting insert 114 with the adjustable abutment 124 and the differential screw 126. The thread for the differential screw 126 in the parent body 116 of the machine-operated tool is oriented in such a way that the axis 121 of the differential screw 126 runs with a slight inclination relative to the bottom supporting surface of the insert seat: here, the axis 133 of the fastening screw 129, which is perpendicular to the bottom supporting surface of the insert seat, and the axis 121 of the differential screw 126 are at an angle α relative to one another. The angle is preferably within the range of $0° \leq \alpha \leq 10°$.

The linear guide 111 for the adjustable abutment 124 in the parent body 116 of the machine-operated tool 110 is formed with an inclination which corresponds to the inclination of the differential screw. Moments of force and torsional moments which occur at the abutment 122 if forces 137 for the adjustment of the cutting insert 114 are transmitted are thus absorbed by the linear guide. These forces and moments are introduced into the parent body 124 of the machine-operated tool 110 by the linear guide 111. The result of this is that the differential screw 126 is not subjected to any bending moments. The differential screw 126 can therefore be precisely adjusted at any time.

Figure 15:
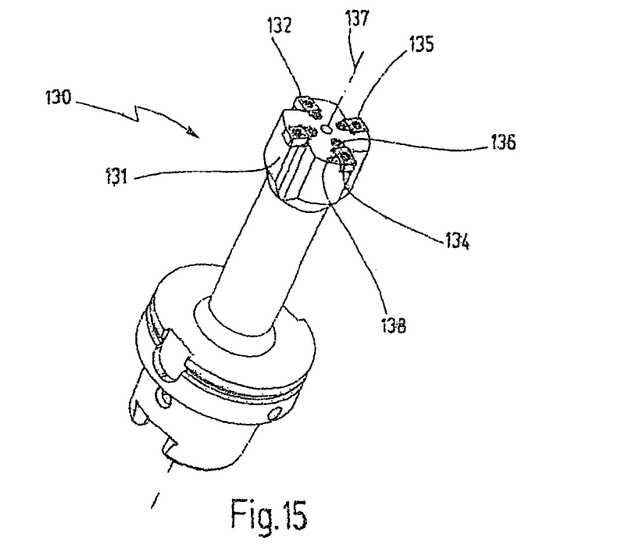
FIG. 15 shows a sixth machine-operated tool having four adjustable cutting inserts.

A sixth machine-operated tool 130 having four insert elements 132 which are designed as indexable cutting inserts is shown in FIG. 15. The machine-operated tool 130 has a rotation axis 137. This tool is also suitable for counterboring and fine boring in one operation. The indexable cutting inserts 132 are held in an insert seat 134 against the bottom supporting surface by means of a screw 135 at the end face of a parent body 131 of the machine-operated tool 130. In the machine-operated tool 130, the bottom supporting surfaces on the insert seats for the indexable cutting inserts 132 are oriented perpendicularly to the rotation axis 137 of said machine-operated tool 130. As in the machine-operated tool 110 from FIG. 10, an adjustable abutment 136 and a fixed abutment 138 are provided for each cutting insert 132 in the machine-operated tool 130. The adjustable abutment 136 is designed identically to the abutment 22 on the machine-operated tool 10 from FIG. 1. The fixed abutment 138 is formed by a lateral boundary section of the insert seat 134. In this arrangement of the indexable cutting inserts, extremely high cutting forces can be introduced into the parent body 131 of the machine-operated tool 130. The machine-operated tool 130 therefore enables very large cutting depths. In this case, the indexable cutting inserts 132 and the abutments 136 are easily accessible.

Figure 16:
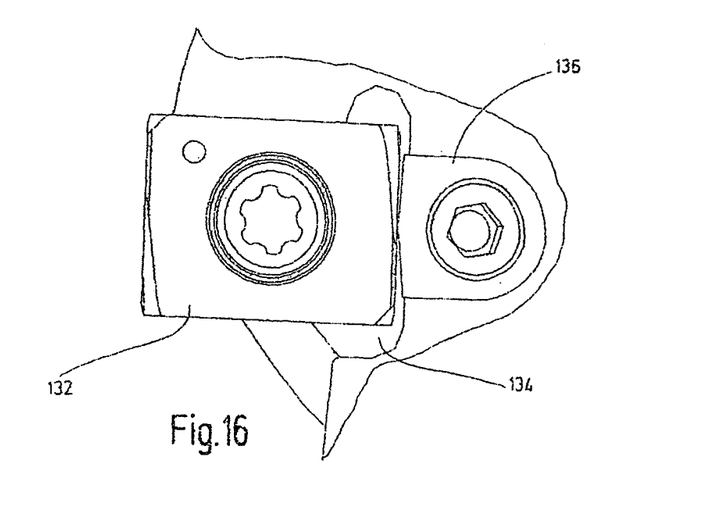
FIG. 16 shows a section of the sixth machine-operated tool having an adjustable cutting insert.

FIG. 16 shows a front view of a section of the machine-operated tool 130 with a cutting insert 132 and the movable abutment 136.

Figure 17:
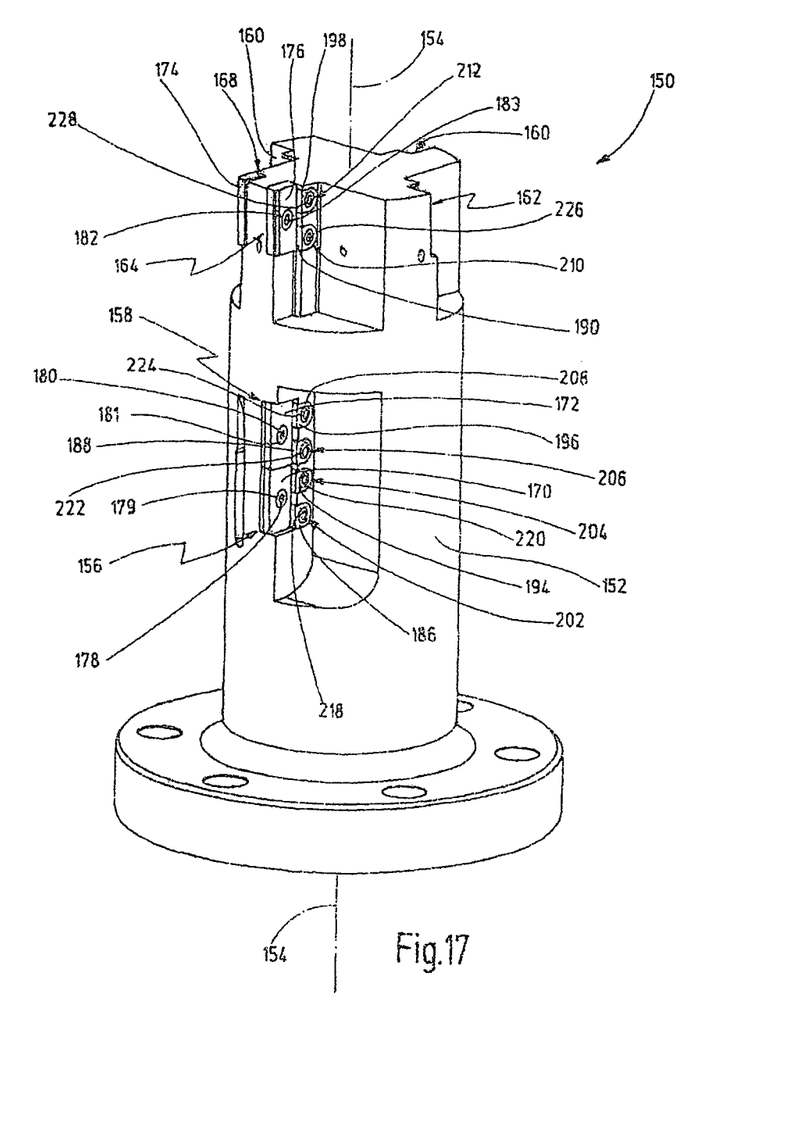
FIG. 17 shows a seventh machine-operated tool having adjustable cutting inserts and having an adjustable guide insert.

FIG. 17 shows a machine-operated tool 150 designed as a reaming tool. The machine-operated tool 150 has a parent body 152. It can be moved about the rotation axis 154 by connection of a machine spindle of a machine tool (not shown in any more detail). There are insert seats 156, 158, 160, 162, 164, 168 on the parent body 152 of the machine-operated tool 150. Insert elements in the form of a cutting insert 170 and a cutting insert 172 are arranged in the insert seats 156, 158.

It should be noted that the insert elements 170, 172 can also be designed as guide inserts. There is an insert element designed as a guide insert 174 in the insert seat 168. A cutting insert 176 is secured in the insert seat 166.

Each insert element 170, 172, 174, 176 is secured in its insert seat 156, 158 to the parent body 152 of the machine-operated tool by a screw 178, 180, 182, 184 which passes through a hole 179, 181, 183, 185 in the insert element 170, 172, 174, 176. In this case, each insert element bears against the bottom supporting surface 161 of an insert seat 160. There is a first adjustable abutment 186, 188, 190, 192 and a second adjustable abutment 194, 196, 198 and 200 at each of the insert seats 156, 158, 164, 168. Like the abutments 22, 24 in the machine-operated tool 10 from the FIG. 1, the abutments 186, 188, 190, 192, 194, 196, 198 are each held in a linear guide 202, 204, 206, 208, 210, 212, 214, 216 on the parent body 152 of the machine-operated tool 150 by means of a differential screw 218, 220, 222, 224, 226, 228, 230, 232. The insert elements 170, 172, 174, 176 bear with a lateral insert surface against bearing surfaces 193, 201 of an abutment 192, 200. The abutments 186, 188, 190, 192, 194, 196, 198 can be adjusted by the differential screw 218, 220, 222, 224, 226, 228, 230, 232.

The corresponding fastening screw 178, 180, 182, 184 for these insert elements 170, 172, 174, 176 is deformed by setting the abutments 186, 188, 190, 192, 194, 196, 198 and 200. This permits the adjustment of the position and orientation of the cutting edge 234 of the cutting inserts 170, 172, 174 and of the guide edge 236 of the guide insert 176 relative to the rotation axis 154 in the machine-operated tool 150. In this case, the linear guides 202, 204, 206, 208, 210, 212, 214, 216 absorb moments of force and torsional moments which occur on account of adjusting forces for the insert elements at the abutments 186, 188, 190, 192, 194, 196, 198. The moments of force and torsional moments at the abutments 186, 188, 190, etc. are introduced into the parent body 152 of the machine-operated tool 150 by means of the linear guides 202, 204, 206, etc.

Figure 18:
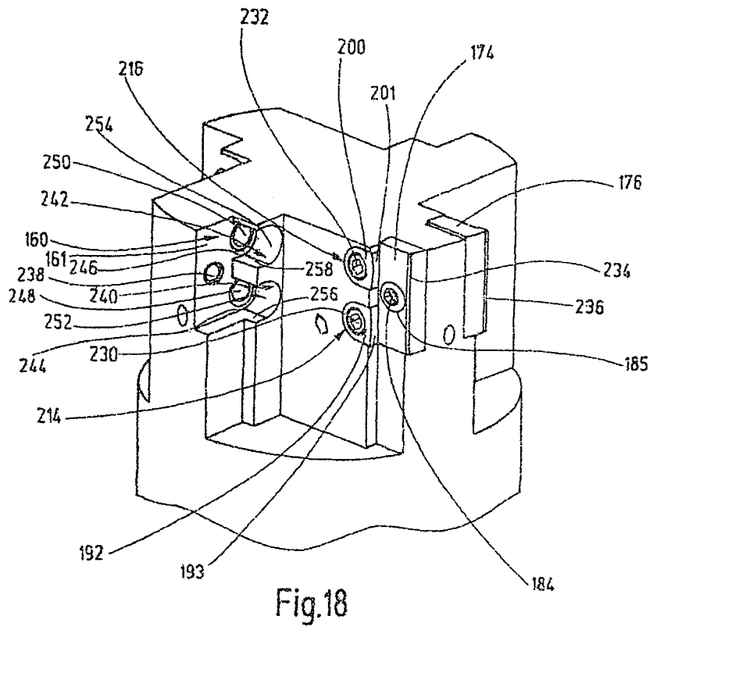
FIG. 18 shows a section of the seventh machine-operated tool having the adjustable guide insert.

FIG. 18 shows an insert seat 160 of the machine-operated tool without an insert element and without adjustable abutments. As in the other insert seats 156, 158, 164, 168 which can be seen in FIG. 17, there is a tapped hole 238 in the insert seat 160. This tapped hole 238 is designed for accommodating a fastening screw which passes through a hole in the insert element. The fastening screw serves to secure an insert element to the insert seat 160. A linear guide 240 for a first adjustable abutment and a linear guide 242 for a second adjustable abutment are formed at the insert seat 160. These abutments preferably have a geometry as explained with reference to FIGS. 4a and 4b. There is a respective bottom section 244, 246 having a tapped hole 248, 250 for accommodating a differential screw in the linear guides 240, 242. A preferred embodiment of a suitable differential screw is shown in FIG. 5.

Each linear guide 240, 242 has a curved section 252, 254 which merges on the one side in each case into a first straight planar section 256 and on the other side into a second straight planar section 258. The curved sections 252, 254 serve to accommodate guide sections 60, curved in a circular arc shape, of an abutment for an insert element, as shown in FIG. 4a and FIG. 4b. The straight sections 256, 258 of a linear guide 240, 242 adjoin the correspondingly curved sections 252, 254 of the linear guides 240, 242. They are designed for interacting with a tangential surface section 58 of an abutment shown in FIG. 4a and FIG. 4b. The described geometry of the linear guides 240, 242 ensures guidance of corresponding abutments free of jamming, even if said abutments are acted upon by very high forces for setting an insert element.

In the machine-operated tools 10, 70, 81, 84, 110, 130, 150 described, in particular a time-saving and thus economical setting of an insert element is possible, which, for example, can be designed as a cutting insert 16, 83, 85, 114 or 132 or as a guide insert 174. To this end, first of all an insert element 16, 83, 85, 114 or 132, 174 is adjusted in its insert seat 18, 112, 134, 168 while adjusting an abutment 22, 24, 72, 88, 90, 122, 136, 192, 198 to an undersize. After that, the insert element 16, 85, 114, 132, 174 is secured to the insert seat 18, 112 or 134, 174 in the parent body 12, 116, 131, 152 by means of screw 20, 184 passing through the hole 42, 89, 185 in the insert element 16, 83, 85, 114 or 132, 174, with the use of a torque wrench. In a third step, the insert element 16, 83, 85, 114 or 132, 174, when securing to the insert seat 18, 112, or 132, 174, while simultaneously measuring the insert setting on the machine-operated tool 10, 70, 81, 84, 110, 130, 150, is readjusted to a specified size by the adjustable abutment 22, 24, 72, 88, 90, 122, 136, 192, 198 provided for the insert element 16, 83, 85, 114 or 132, 174 being set. The machine-operated tools described are also suitable in particular for machining workpieces during which a rotating workpiece is moved about the tool axis of the machine-operated tool.

In summary, the following can be stated: the invention relates to a machine-operated tool 10 having a parent body 12. There is an insert seat 18 on the parent body 12, said insert seat 18 having an insert element 16 which is arranged therein and which can be designed, for example, as a cutting insert or as a guide insert. The insert element 16 has at least one insert edge 38 which projects freely outward beyond the insert seat 18 and bears against a bottom supporting surface 26 of the insert seat 18. The insert element 16 can be secured to the insert seat 18 by means of a screw 20 which passes through a hole 42 in the insert element 16. A first abutment 22 for the insert element 16 is provided at the insert seat 18, said abutment 22 having a bearing surface 34, against which the insert element 16 bears frictionally with a lateral insert surface 38. A further abutment 24 for a lateral insert surface 40 of the insert element 16 to bear against frictionally is formed at the insert seat 18. To set the insert edge 38 of the insert element 16, an adjusting device 30 is assigned to the first abutment 22, said adjusting device 30 enabling the abutment 22 to be lifted and lowered with respect to the bottom supporting surface 26 of the insert seat 18. In this case, a linear guide 50 is provided for the first abutment 22, said linear guide 50 absorbing forces and moments which occur during the setting of the insert element 16 and introducing them into the parent body 12 of the machine-operated tool 10.

The invention claimed is:

1. A machine-operated tool,
comprising a parent body (12, 152),
comprising at least one insert element (16, 174, 176) which is arranged in an insert seat (18, 162) on the parent body (12, 152) and
which has at least one insert edge (38, 234, 236) projecting freely outward beyond the insert seat (18, 160, 162) and bearing against a bottom supporting surface (26, 161) of the insert seat (18, 160, 162) and which can be secured to the insert seat (18, 160, 162) by means of a screw (20, 154) which passes through a hole (42, 185) in the insert element (16, 174, 176),
in which machine-operated tool a first abutment (22, 192) is provided for the insert element (16, 174, 176) at the insert seat (18, 160, 162), said abutment (22, 192) having a bearing surface (34, 193) against which the insert element (16, 174, 176) bears frictionally with a lateral insert surface (40), and
in which a further abutment (24, 200) having a bearing surface (36, 201) for a lateral insert surface (40) of the insert element (16, 174, 176) to bear against frictionally is formed at the insert seat (18, 160, 162),
wherein an adjusting device (30, 320, 232) is assigned to at least one abutment (22, 192, 200) for setting the insert edge (38, 234, 236) of the insert element (16, 174, 176), said adjusting device (30, 320, 232) enabling this abutment (22, 192, 200) to be lifted and lowered with respect to the bottom supporting surface (26, 161) of the insert seat (18, 160, 162), characterized in that the at least one abutment (22, 192, 200) with adjusting device (30, 230, 232) is guided with a flat outer surface section (58) and with a curved outer surface section (60) in a linear guide (50, 216, 240, 242) formed on the parent body (12, 152) in order to absorb the forces and moments which occur at the abutment (22, 192) during the setting of the insert element (16, 176) and direct them into the parent body (12, 152).

2. The machine-operated tool as claimed in claim 1, characterized in that the bearing surface of the at least one abutment (22) or the lateral insert surface (40) bearing against the abutment (22) is curved.

3. The machine-operated tool as claimed in claim 2, characterized in that the bearing surface of the at least one abutment (22) or the lateral insert surface (40) bearing against the abutment (22) is convexly curved.

4. The machine-operated tool as claimed in claim 2, characterized in that the bearing surface (69) of the at least one abutment (61) or the lateral insert surface (40) bearing against the abutment (61) is a prismatically curved surface having surface sections (71) arranged segmentally in a row.

5. The machine-operated tool as claimed in claim 1, characterized in that the further abutment (24) is adjustable and can be lifted and lowered with respect to the bottom supporting surface (26) of the insert seat (18).

6. The machine-operated tool as claimed in claim 5, characterized in that a linear guide (54) is provided for the further abutment (24), said linear guide (54) absorbing forces and moments which occur during the setting of the insert element (16) and directing them into the parent body (12) of the machine-operated tool (10).

7. The machine-operated tool as claimed in claim 1, characterized in that a third abutment (72) for the insert element (16) is provided at the insert seat (18), said third abutment (72) having a bearing surface (41) against which the insert element (16) bears frictionally with a lateral insert surface (45).

8. The machine-operated tool as claimed in claim 7, characterized in that the at least one bearing surface (41) of the third abutment (72) or the lateral insert surface (45) is curved, in particular convexly curved or prismatically curved.

9. The machine-operated tool as claimed in claim 7, characterized in that the third abutment (72) is adjustable and can be lifted and lowered with respect to the bottom supporting surface (26) of the insert seat (18).

10. The machine-operated tool as claimed in claim 9, characterized in that a linear guide (75) is provided for the third abutment (72), said linear guide (75) absorbing forces and moments which occur at the third abutment (72) during the setting of the insert element (18) and directing them into the parent body (12) of the machine-operated tool (10).

11. The machine-operated tool as claimed in claim 1, characterized in that an adjusting wedge having a wedge surface (34) inclined relative to the bottom supporting surface (26) of the insert seat (18) is provided as abutment (22, 24, 72).

12. The machine-operated tool as claimed in claim 11, characterized in that the wedge surface is curved, in particular prismatically curved.

13. The machine-operated tool as claimed in claim 11, characterized in that the wedge surface (34) is curved in a first direction (44) and in a second direction (46) different from the first direction (44).

14. The machine-operated tool as claimed in claim 1, characterized in that a differential screw (30, 32, 74, 126) guided on an abutment (22, 24, 72) and in the parent body (12, 116) is provided as adjusting device.

15. The machine-operated tool as claimed in claim 14, characterized in that the abutment (22) has a curved bearing surface (34) having a vertex (43), wherein the linear guide (50) has a guide section (55, 252, 254) curved in a circular arc shape, wherein the axis (68) of the differential screw (30) lies at the center of this guide section curved in a circular arc shape, and wherein the radius of curvature of the bearing surface (34) at the vertex (43) is not greater than 14 times the distance of the vertex (43) from the axis (68) of the differential screw (30).

16. The machine-operated tool as claimed in claim 14, characterized in that the axis (121) of the differential screw (126) is inclined relative to the bottom supporting surface for the insert element (114) on the insert seat (112).

17. The machine-operated tool as claimed in claim 1, characterized in that the insert element (83) has an insert top (99) producing a diameter, wherein the at least one abutment (22) with adjusting device (30) is arranged at the insert seat (18) in such a way that the at least one adjusting force (93) introduced into the insert element (83) by the at least one abutment (22) runs so as to be directed toward the insert top (99).

18. The machine-operated tool as claimed in claim 1, characterized in that the insert element (16) bears with a common lateral insert surface (40) against the first abutment (22) and the further abutment (24).

19. The machine-operated tool as claimed in claim 1, characterized in that the insert element (16) bears with different lateral insert surfaces (40, 45) against the first and the further abutment (22, 72).

20. The machine-operated tool as claimed in claim 1, characterized in that the insert element is a cutting insert (16, 83, 114, 132, 176) or a guide insert (170, 172, 174).

21. A method for setting a machine-operated tool (10) designed as claimed in claim 1, comprising the following steps:
  i. prepositioning an insert element (16, 176) in the insert seat (18, 162) by adjusting at least one abutment (22, 192) to an undersize;
  ii. securing the insert element (16, 176) in the insert seat (18, 162) to the parent body (12, 152) in a defined manner by means of the screw (20, 184) which passes through a hole (42, 185) in the insert element (16, 176);
  iii. readjusting the at least one abutment (22, 192) to a specified size while simultaneously measuring the setting of the insert element (16, 176).

* * * * *